Sept. 11, 1962 H. FARBER 3,053,562
STATION WAGON WITH EXTENSIBLE ROOF
Filed July 21, 1960 2 Sheets-Sheet 1

INVENTOR.
HARRY FARBER

BY *Arthur H. Seidel*

ATTORNEY

Sept. 11, 1962   H. FARBER   3,053,562
STATION WAGON WITH EXTENSIBLE ROOF
Filed July 21, 1960   2 Sheets-Sheet 2

INVENTOR.
HARRY FARBER
BY Arthur H. Seidel
ATTORNEY

United States Patent Office 3,053,562
Patented Sept. 11, 1962

3,053,562
STATION WAGON WITH EXTENSIBLE ROOF
Harry Farber, 6659 Rutland St., Philadelphia, Pa.
Filed July 21, 1960, Ser. No. 44,372
6 Claims. (Cl. 296—26)

This invention relates to a self-propelled motor vehicle having an extensible roof. More particularly, this invention relates to a station wagon automobile having an extensible roof, said roof being substantially indistinguishable from any other station wagon roof.

There is a need for an all purpose vehicle which is substantially indistinguishable from other vehicles of that type and having an extensible roof capable of being selectively raised or lowered. Station wagons are ideal vehicles for camping, picnics, cross country journeys, etc.

The present invention is directed more particularly to a station wagon having an extensible roof capable of being raised so as to increase the area within said station wagon. Many camping trips, picnics, etc. have been spoiled due to foul weather. The present invention provides a means whereby said camping trips, picnics, etc. need not be a complete failure.

It is an object of the present invention to provide a station wagon with an extensible roof capable of being raised or lower in a direction perpendicular to the longitudinal axis of the station wagon.

It is another object of the present invention to provide a station wagon with an extensible roof, said roof being indistinguishable from the roofs of other vehicles in the lowermost position of said roof.

It is another object of the present invention to provide a station wagon with an extensible roof capable of being raised or lowered, said roof having secondary side walls operable by the movement of said roof.

It is still another object of the present invention to provide a station wagon with an extensible roof whereby the ceiling within said station wagon may be converted into a bed having an enclosure therearound.

It is still another object of the present invention to provide a station wagon with an extensible roof, and a ceiling comprised of pivotable panels adapted to support the roof in its extended position.

Other objects will appear hereinafter.

For purposes of illustrating the invention there is shown in the drawings forms which are presently preferred; it being understood, however, that this invention is not limited to the precise arrangements and instrumentalities shown.

Figure 1:
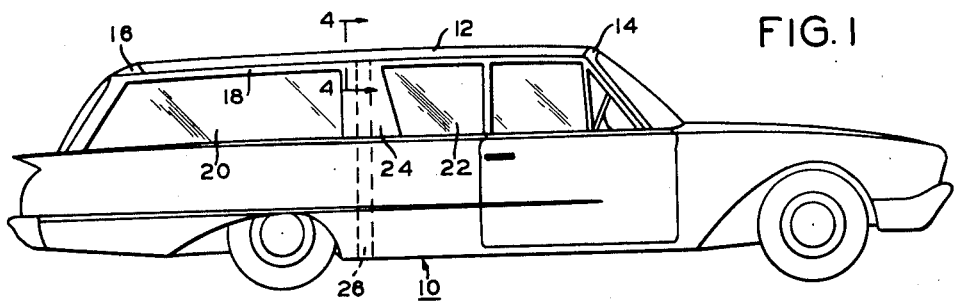
FIGURE 1 is a side elevation view of a station wagon of the present invention.

Referring to the drawing in detail, wherein like numerals indicate like elements, there is shown in FIGURE 1 a station wagon designated generally as 10. The station wagon 10 per se forms no part of the present invention.

The station wagon 10 is provided with a roof 12. The roof 12 is provided with beveled ends which mate with beveled surfaces on the front cross bar 14 and the rear cross bar 16. The cross bars 14 and 16 provide a support for the front and rear window structure. As shown more clearly in FIGURE 1, the roof 12 in its lowermost position merges with the cross bars 14 and 16 so as to present a station wagon having a roof which is substantially indistinguishable from the roof on any other station wagon. A side frame 18 extends along both sides of the station wagon 10 between the cross bars 14 and 16. A rear side window 20 and an intermediate window 22 are separated by a side panel 24. The side panel 24 merges into the side frame 18 at its upper end and merges into the body of the station wagon 10 at its lower end.

As will be made clear hereinafter, the roof 12 is moved from the position shown in FIGURE 1 to the position shown in FIGURE 2, and vice versa, by a shaft 28 which telescopes within a cylindrical casing 26. The cylindrical casing 26 is disposed between the walls 30 and 32 of the side panel 24.

Figure 4:
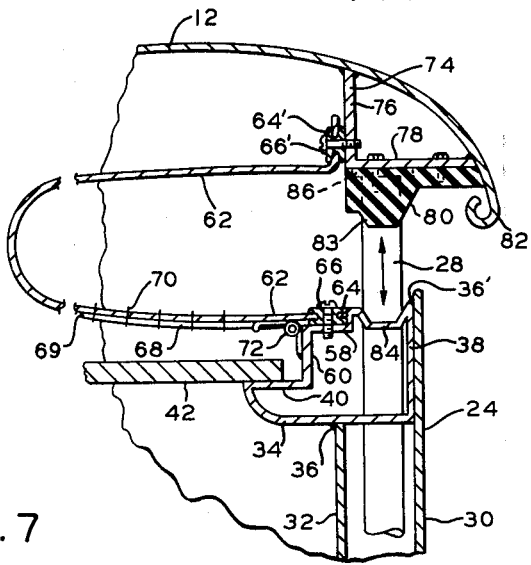
FIGURE 4 is a sectional view taken along the lines 4—4 in FIGURE 1.

As shown more clearly in FIGURE 4, the wall 30 is an outer wall and the wall 32 is an inner wall shorter than the outer wall 30. A hollow extruded support 34 is positioned on the uppermost surface of the inner wall 32 and is fixedly secured thereto in any convenient manner as by welding 36. The hollow extruded support 34 is provided with an outer upright wall which is juxtaposed to the outer wall 30 and is also fixedly secured thereto in any convenient manner as by the welding 36'.

The hollow extruded support 34 is provided with a substantially horizontal wall 40 on its inner surface. A panel 42 of the ceiling of the station wagon 10 is supported along its side edges on the wall 40. As shown more clearly in FIGURE 3, the panel 42 is pivotably secured to the panel 44 by a hinge 46. The panel 44 is pivotably secured along its opposite edge to the frame of the station wagon 10 by a hinge 48.

Figure 2:
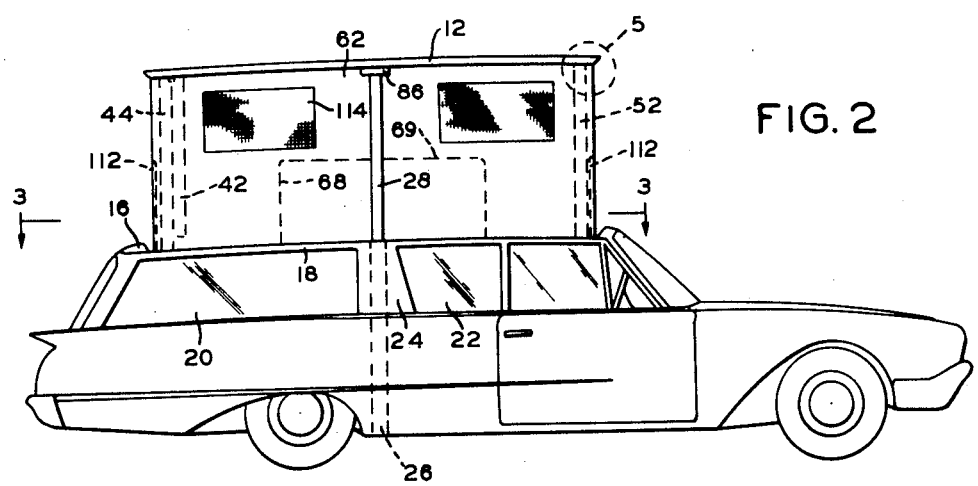
FIGURE 2 is a side elevation view of the station wagon of the present invention with the roof thereof in its uppermost position.

As shown more clearly in FIGURE 2, the hinge 46 enables the panels 42 and 44 to pivot relative to one another so that the panel 42 is juxtaposed to the innermost surface of the panel 44. The position of the hinge 46 may be reversed, if desired, so that it pivotably joins panels 52 and 42. In this manner, the panel 44 may be pivoted to the phantom position shown in FIGURE 2 thereby providing a free walking space at the rear of the vehicle even though panels 52 and 42 are disposed in a horizontal position. The panel 44 is provided with a knob 50 for a purpose to be made clear hereinafter.

A panel 52 is pivotably secured along one edge to the body of the station wagon 10 by a hinge 54. The panel 52 is provided with a knob 56 for a purpose to be made clear hereinafter. The panels 42, 44 and 52 comprise the ceiling of the station wagon 10 and are each supported along their side edges on the wall 40 of the hollow support member 34.

Referring to FIGURE 4, the hollow support 34 is provided with a horizontally disposed wall 58 which is connected to the wall 40 by an upright wall 60. A flexible member such as canvas 62 is fixedly secured to the wall 58 by a screw 66 which extends through a grommet 64. Grommets such as grommet 64 are spaced along one edge of the canvas 62. A screw 66 extends through each grommet and extends into a threaded hole in the wall 58.

A U-shaped rod 68 is fixedly secured to the canvas 62 on each side of the station wagon 10 by stitching 70.

The U-shaped rods 68 are disposed with their bight portion 69 juxtaposed to one another in the lowermost position of the roof 12. The free ends of the U-shaped rods 68 are fixedly secured to one end of a spring device 72. The other end of the spring device 72 is fixedly secured to the wall 60 of the hollow support 34. The spring device 72 is positioned so that it biases the U-shaped rods 68 to a substantially horizontal position intermediate the roof 12 and the panels of the ceiling of the station wagon 10.

As shown more clearly in FIGURE 2, the parallel arms of the U-shaped rod 68 are spaced apart by a distance substantially less than the length of the canvas 62 and more substantially equidistant from the shaft 28. In the lowermost position of the roof 2, the U-shaped rods 68 assume a position parallel to the ceiling of the station wagon 10. In the extended position of the roof 12, as shown in FIGURE 2, the U-shaped rods 68 assume a position substantially parallel to the walls 30 and 32 of the side panel 24.

The roof 12 is substantially flat and is provided with arcuate portions along its side edges. An angle iron 74 is fixedly secured to the inner surface of the roof 12 along the arcuate side edges of the roof 12 as shown more clearly in FIGURE 4. The angle iron 74 is provided with walls 76 and 78 which are fixedly secured to the inner surface of the roof 12 in any convenient manner such as by welding. The upper edge of the canvas 62 is provided with spaced holes therealong. Grommets 64' are positioned within each of said latter mentioned holes and screws 66' extend through the grommets 64'. The screws 66' extend into threaded holes in the wall 76 of the angle iron 74.

A gasket 80 of any suitable weather stripping material such as rubber is fixedly secured to the lowermost surface of the wall 78 of the angle iron 74 adjacent the watershed 82 on the roof 12. The gasket 80 is provided with a pronounced ridge 83 which is adapted to cooperate with the groove 84 on the hollow extruded support 34 so as to provide a water-tight seal around the periphery of the roof 12.

The shaft 28 is provided with a flange 86 at its uppermost end for attachment to the roof 12. The shaft 28 is hollow, as seen more clearly in FIGURE 6, and is telescopically received within the uppermost end of the cylindrical casing 26. The cylindrical casing 26 is provided at its lowermost end with a mounting plate 88. The mounting plate 88 is provided with a plurality of holes so that the mounting plate 88 may be fixedly secured to the body of the station wagon 10. A reversible electric motor 90 is provided with oppositely directed output shafts 92 and 92'.

The output shaft 92 operates to cause reciprocating movement of the shaft 28 on one side of the station wagon 10 while the output shaft 92' operates to cause reciprocating movement of a shaft 28 on the opposite side of the station wagon 10. Therefore, it is deemed sufficient to merely describe in detail the relationship between one of the shaft 28 and the output shaft 92.

Figure 6:
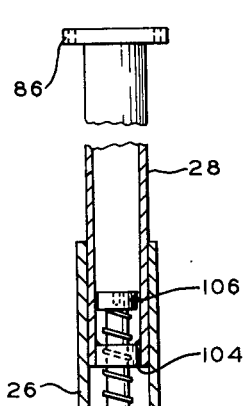
FIGURE 6 is a longitudinal sectional view of the apparatus for raising and lowering the roof of the present invention.

As shown more clearly in FIGURE 6, a beveled gear 94 is fixedly secured to the output shaft 92 adjacent one end of the output shaft 92. The end of the output shaft 92 remote from the motor 90 is rotatably mounted within the bearing block 96. The gear 94 meshes with the beveled gear 98 on the threaded shaft 100. The threaded shaft 100 is disposed within the casing 26 and extends through the end wall 102 which is fixedly secured to the casing 26 in any convenient manner such as by welding. The lowermost end of the threaded shaft 100 is also rotatably secured within the bearing block 96. The upper end of the threaded shaft 100 extends through a threaded hole in the end wall 104 on the shaft 28. The uppermost end of the threaded shaft 100, which is disposed within the shaft 28, is provided with a guide bushing 106.

A shaft 107 is rotatably supported in bearing block 96 and extends from the bearing block 96 in a direction opposite to the direction of the threaded shaft 100. The shaft 107 is provided with a beveled gear 108. The beveled gear 108 is fixedly secured to the shaft 107 and meshes with the beveled gear 94. The lowermost end of the shaft 107 is provided with a hex-head 110. The hex-head 110 is adapted to cooperate with a manual tool for manually raising and lowering the roof 12 in the event of a power failure.

Figure 3:
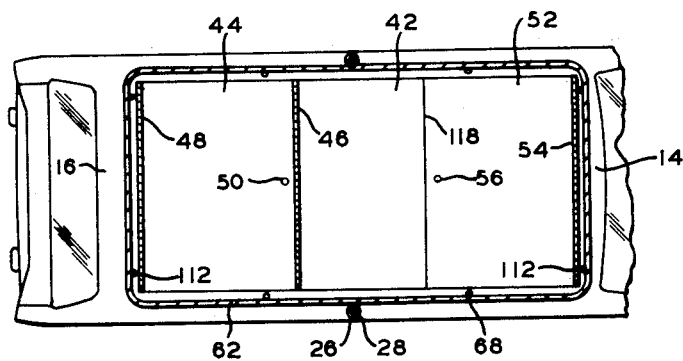
FIGURE 3 is a sectional view taken along the lines 3—3 in FIGURE 2.

Referring to FIGURES 2 and 3, it will be seen that the end panels of the canvas 62 are provided with rods 112 which are U-shaped and perform the same function as the rods 68. The arms on the U-shaped rods 112 are spaced apart by a distance substantially equal to the length of the end panels of the canvas 62. The free ends of the rods 112 are pivotably secured to the body of the station wagon 10 and are provided with a spring device identical with the spring device 72 on the rods 68.

Referring in particular to FIGURE 2, it will be noted that the length of the arms on the U-shaped rods 112 are less than the distance between the end panels on the canvas 62 and the arms on the U-shaped rods 68. In the lowering of the roof 12, the rods 112 cause substantially the whole length of the end panels of the canvas 62 to be folded in an overlapping relation while the rods 68 cause only the central portion of the side panels of the canvas 62 to be folded in an overlapping relation. The positions of the rods 68 and 112 are sufficient to cause the intermediate portion of the canvas 62 to be folded as the roof 12 moves to its lowermost position. In the lowermost position of the roof 12, the side and end panels of the canvas 62 are in a folded overlapped condition intermediate the roof 12 and the ceiling of the station wagon 10.

Figure 5:
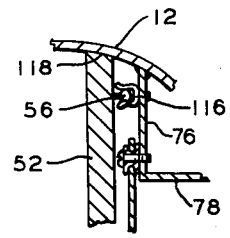
FIGURE 5 is a detail sectional view of the structure within the dotted circle 5 of FIGURE 2.

Referring in particular to FIGURE 5, it will be seen that the roof 12 is partially supported by the ceiling panel 52 in the uppermost position of the roof 12. The ceiling panel 52 absorbs some of the weight of the roof 12 which would otherwise be transmitted to the threaded shaft 100. To maintain the panel 52 in the position shown in FIGURE 5 and shown in phantom in FIGURE 2, the wall 76 of the angle iron 74 is provided with a spring clip 116 which cooperates with the knob 56 on the panel 52. In the event that the roof 12 is slightly arcuate as shown in FIGURE 5, the end 118 of the panel 52 is correspondingly beveled so that the end 118 is in contact with the inner surface of the roof 12 over substantially the entire width of the end 118.

The present invention is utilized in the following manner:

When the weather is inclement and it is desired to utilize the rear portion of the station wagon 10 for a picnic, for camping, etc. the station wagon 10 is parked in any suitable place. A switch (not shown) on the dashboard of the station wagon 10 is operated so as to operate the reversible motor 90. The motor 90 rotates the shafts 92 and 92' which in turn rotate the beveled gear 98 through the beveled gear 94. Each of the beveled gears 94 and 98 only have rotary motion. The rotary motion of the beveled gear 98 causes the threaded shaft 100 to rotate. Rotation of the threaded shaft 100 causes the shaft 28 to reciprocate due to the threaded relationship between the shaft 100 and the hole extending through the end wall 104. Vertical movement in an upward direction of the shaft 28 causes the roof 12 to move toward its uppermost position.

As the roof 12 moves upwardly, the end and side panels of the canvas 62 are unfolded and the rods 68 and 112 are moved to a position wherein they are angled with respect to the ceiling of the station wagon 10. As the rods 68 and 112 move with the end and side panels of the canvas 62, the rods 68 and 112 are pulling against the spring action of the spring device 72. When the roof 12 has reached its uppermost limit, a limit switch (not shown) will shut off the reversible electric motor 90. Then a person within the rear portion of the station wagon 10 may pivot the ceiling panel 52 to the phantom position shown in FIGURE 2 wherein the knob 56 will be resiliently retained by the resilient latch member 116. If it is desired to sleep within the station wagon 10, a bed roll is placed on the ceiling panels 42 and 44 which are supported along their side edges by the wall 40 on the hollow extruded support 34. If it is desired to eat a meal, play cards, etc. within the station wagon 10, the ceiling panels 42 and 44 are pivoted to the phantom position shown in FIGURE 2.

When it is desired to lower the roof 12, the reversible motor 90 is activated in the opposite direction so as to lower the roof 12. When the roof 12 is lowered, the rods 68 and 112 automatically cause the side and end panels of the canvas 62 to assume an overlapped folded position intermediate the roof 12 and the ceiling panels which have been pivoted to their normal position wherein they are supported along their side edges by the wall 40 of the hollow extruded support 34.

The side panels of the canvas 62 are provided with windows 114 which may be of a transparent plastic material or an open-mesh type material. The windows 114 will provide light and fresh air for the interior of the station wagon 10 when the roof 12 is in its extended position.

Since the apparatus for raising and lowering the roof 12 is operable from within the interior of station wagon 10, it is possible to convert the station wagon 10 into a camper without going outside of the station wagon 10. This is an important feature when there is inclement weather since the camping apparatus used heretofore necessitates the user to set up the camping apparatus outside of the vehicle. When the roof 12 is in its lowermost position, said roof is not readily distinguishable from the roof of any other station wagon.

Figure 7:
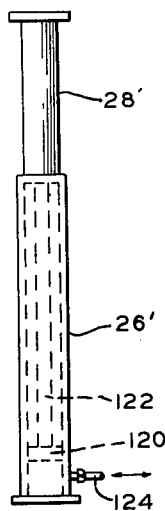
FIGURE 7 is an elevational veiw of another embodiment of the apparatus for raising and lowering the roof of the present invention.

An alternative mechanism for raising and lowering the roof 12 is shown in FIGURE 7. The mechanism shown in FIGURE 7 is a hydraulic unit which may be utilized to raise and lower the roof 12. The casing 26' receives a piston 120 which is connected to the shaft 28' by a piston rod 122. A conduit 124 communicates with the interior of the casing 26' below the piston 120 for supplying a hydraulic fluid under pressure so as to activate the piston 120. The conduit 124 will extend to a reservoir of hydraulic fluid and a reversible electrically operated pump will be positioned within said conduit for supplying an exhausting hydraulic fluid to the casing 26'.

Figure 8:
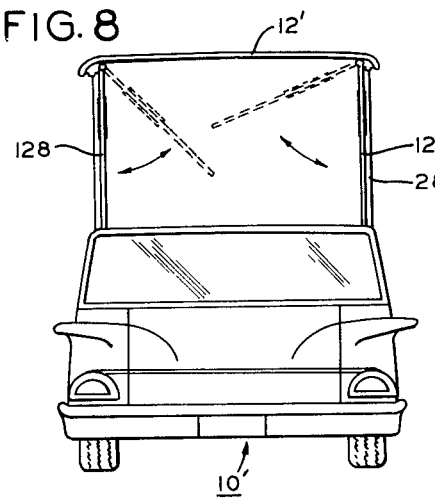
FIGURE 8 is a rear elevational view of another embodiment of the present invention.

FIGURE 8 discloses an alternative embodiment of the present invention. The station wagon 10' is substantially identical with the station wagon 10. Rigid panels 126 and 128 are pivotably secured to the inner surface of the roof 12' in place of the canvas 62. As the roof 12' is raised to its uppermost position, the panels 126 and 128 pivot to the solid line position shown in FIGURE 8. When it is desired to lower the roof 12' to its lowermost position, the panels 126 and 128 are pivoted so that they are overlapping one another and a latch means (not shown) is provided for maintaining the panels 126 and 128 in their overlapped position. The panels 126 and 128 are shown in phantom in FIGURE 8 in an intermediate position.

Since the panels 126 and 128 are made from a rigid material such as plywood, plastic, aluminum, etc., the panels 126 and 128 are capable of supporting the roof 12' in its uppermost position. The station wagon 10' is otherwise in all respects identical with the station wagon 10.

Figure 9:
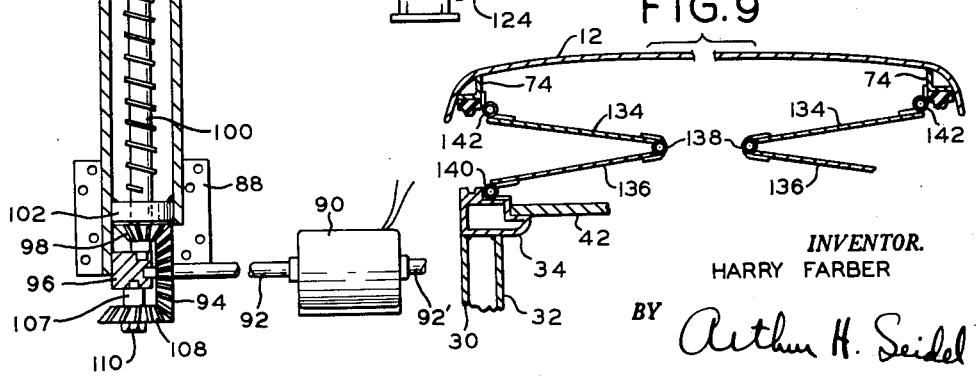
FIGURE 9 is a transverse sectional view of another embodiment of the present invention.

FIGURE 9 shows another alternative embodiment of the present invention. In this embodiment, rigid panels 134 and 136 are substituted for the canvas 62. The panels 134 and 136 extend along substantially the full length of the roof 12 and are pivotably joined along one side edge by a hinge 138. The other side edge of the panel 136 is pivotably joined to the wall 58 on the hollow extruded support 34 by a hinge 140. The side edge of the panel 136 adjacent the hinge 140 is provided with a spring device such as the spring device 72 in FIGURE 4 for biasing the panel 136 to a position substantially parallel to the ceiling panel 42.

The other edge of the panel 134 is pivotably secured to the wall 76 of the angle iron 74 by a hinge 142. The panel 134 is provided with a spring device adjacent the hinge 142 for biasing the panel 134 to a position wherein said panel 134 is substantially parallel to the ceiling panel 42. The panels 134 and 136 are made from a rigid material such as plywood, plastic, aluminum, etc. The panels 134 and 136 are shown in FIGURE 9 in a partially collapsed position. As the roof 12 is moved to its uppermost position by the shaft 28 (not shown in FIGURE 9), the panels 134 and 136 unfold and assume a position substantially perpendicular to the ceiling panel 42. As the roof 12 moves from its extended position to its lowermost position, the spring devices cause the panels 134 and 136 to pivot about the hinge 138 so as to assume an overlapped condition intermediate the roof 12 and the ceiling of the station wagon.

In each of the embodiments shown in FIGURES 8 and 9, the station wagon may be provided with canvas end panels of the type having accordian pleats whereby said canvas end panels will be extended as the roof is moved to its uppermost position.

In each of the above embodiments of the present invention, the roof of the station wagon is not readily distinguishable from the roof on any other station wagon. The volume of the station wagon is substantially doubled when the roof is in its uppermost position. As the roof moves to its uppermost position, the side and end walls automatically unfold from a position intermediate the roof and the ceiling of the station wagon. In each of the above embodiments, the ceiling of the station wagon is provided with a plurality of pivotable panels permitting access to the increased space due to the movement of the roof to its uppermost position. All of the ceiling panels may be pivoted so as to take advantage of the entire increased space. Alternatively, only one panel may be pivoted so that the remaining panels may be used as a bed.

As used hereinafter, the canvas 62 and the panels 134 and 136 may be referred to as a collapsible wall having a first position substantially perpendicular to the ceiling in the uppermost position of the roof and having a second position substantially parallel to and between the roof and ceiling in the lowermost position of the roof. Hereinafter, the station wagon 10 may be referred to as a self-propelled vehicle.

The present invention may be embodied in other specific forms without departing from the spirit or essential attributes thereof and, accordingly, reference should be made to the appended claims, rather than to the foregoing specification as indicating the scope of the invention.

I claim:

1. A self-propelled vehicle comprising a body, a rigid roof on said body, means on said body for raising and lowering said roof in a direction upright with respect to the longitudinal axis of said body, a ceiling on said body below said roof and spaced from said roof, said ceiling having a length substantially equal to the length of said roof, at least one end of said ceiling being secured to said body, a collapsible wall, said collapsible wall having a first position substantially perpendicular to said ceiling in the uppermost position of said roof, said collapsible wall having a second position between said roof and said ceiling and overlying a side edge portion of said ceiling in the lowermost position of said roof, means mounting said collapsible wall to said roof and to said body so that said collapsible wall moves from said second position to said first position as said roof moves from its lowermost position to its uppermost position, means on said ceiling selectively providing for movement of at least a portion of said ceiling out of the plane of the remainder of said ceiling when said roof is in its uppermost position, said collapsible wall being made from a flexible material, rod members fixedly secured to said collapsible wall, means pivotably securing said rod members to said body, and spring means biasing said rod members to a position whereby said collapsible wall assumes said second position.

2. A self-propelled vehicle in accordance with claim 1 wherein said rod members have a height slightly less than one-half the height of said collapsible wall in said first position thereof.

3. A self-propelled vehicle comprising a body, a rigid roof on said body, means on said body for raising and lowering said roof in a direction upright with respect to the longitudinal axis of said body, a ceiling on said body below said roof and spaced from said roof, said ceiling having a length substantially equal to the length of said roof, at least one end of said ceiling being secured to said body, a collapsible wall, said collapsible wall having a first position substantially perpendicular to said ceiling in the uppermost position of said roof, said collapsible wall having a second position between said roof and said ceiling and overlying a side edge portion of said ceiling in the lowermost position of said roof, means mounting said collapsible wall to said roof and to said body so that said collapsible wall moves from said second position to said first position as said roof moves from its lowermost position to its uppermost position, means on said ceiling selectively providing for movement of at least a portion of said ceiling out of the plane of the remainder of said ceiling when said roof is in its uppermost position, means pivotably securing one side of said portion to one side of said body, said portion having a length substantially equal to the distance between the uppermost and lowermost position of said roof, whereby said portion may be pivoted to a position to support said roof in its uppermost position.

4. In a self-propelled vehicle comprising a body, a rigid roof on said body, means on said body for raising and lowering said roof in a direction upright with respect to the longitudinal axis of said body, a ceiling on said body below said roof and spaced from said roof, said ceiling comprising a plurality of panels, means pivotably securing an end of at least one of said panels to said body, hinge means pivotably connecting the other end of said one panel to another of said panels the side edges of said ceiling panels being supported in a horizontal position by a horizontally disposed wall on said body.

5. A self-propelled vehicle comprising a body, a rigid roof on said body, means on said body for raising and lowering said roof in a direction upright with respect to the longitudinal axis of said body, a ceiling below said roof and spaced from said roof, a collapsible canvas wall extending between said roof and said body, said canvas wall having a first position substantially perpendicular to said ceiling in the uppermost position of said roof, said canvas wall having a second position between said roof and said ceiling in the lowermost position of said roof, rod members fixedly secured to said canvas wall, means pivotably securing said rod members to a body, spring means biasing said rod members to a position whereby said canvas wall assumes said second position, whereby said wall moves from said first position to said second position as said roof moves from said uppermost position to said lowermost position, and means on said ceiling selectively providing for movement of at least a portion of said ceiling when said roof is in its uppermost position.

6. A self-propelled vehicle comprising a body, a rigid roof on said body, means on said body for raising and lowering said roof in a direction upright with respect to the longitudinal axis of said body, a ceiling below said roof and spaced from said roof, the peripheral edge of said roof being arcuate in transverse cross-section, an L-shaped member fixedly secured to the inner surface of said roof adjacent said peripheral edge, one arm of said L-shaped member being substantially perpendicular to the plane of said ceiling, the other arm of said L-shaped member being substantially parallel to the plane of said ceiling, a wall extending between said L-shaped member and said body, one edge of said wall being secured to said body and a juxtaposed edge of said wall being secured to said one arm of said L-shaped member, said wall having a first position substantially perpendicular to the plane of said ceiling in the uppermost position of said roof, said wall having a second position between said roof and said ceiling in the lowermost position of said roof, a resilient seal extending across said other arm of said L-shaped member, and a pronounced ridge on said seal disposed within a groove in said body with the remainder of said seal extending beyond the outer peripheral edge of said body in the lowermost position of said roof.

References Cited in the file of this patent

UNITED STATES PATENTS

| | | |
|---|---|---|
| 1,658,110 | Warren | Feb. 7, 1928 |
| 1,841,991 | Thompson | Jan. 19, 1932 |
| 1,871,871 | Woods | Aug. 16, 1932 |
| 2,243,659 | Thompson | May 27, 1941 |
| 2,483,332 | Brumbaugh | Sept. 27, 1949 |
| 2,714,524 | Swiggum | Aug. 2, 1955 |
| 2,729,497 | Runyan | Jan. 3, 1956 |
| 2,901,282 | Meaker | Aug. 25, 1959 |

FOREIGN PATENTS

| | | |
|---|---|---|
| 106,216 | Australia | Jan. 12, 1939 |
| 702,982 | Germany | Feb. 25, 1941 |
| 689,969 | Great Britain | Apr. 8, 1953 |
| 503,031 | Italy | Dec. 2, 1954 |